(12) United States Patent
Bove et al.

(10) Patent No.: US 11,565,673 B2
(45) Date of Patent: Jan. 31, 2023

(54) HYDRAULIC TANK FOR A BICYCLE

(71) Applicant: CAMPAGNOLO S.r.l., Vicenza (IT)

(72) Inventors: Filippo Bove, Padua (IT); Mario Meggiolan, Creazzo (IT)

(73) Assignee: CAMPAGNOLO S.r.l., Vicenza (IT)

( * ) Notice: Subject to any disclaimer, the term of this patent is extended or adjusted under 35 U.S.C. 154(b) by 137 days.

(21) Appl. No.: 17/113,698

(22) Filed: Dec. 7, 2020

(65) Prior Publication Data

US 2021/0179046 A1 Jun. 17, 2021

(30) Foreign Application Priority Data

Dec. 13, 2019 (IT) .......................... 102019000023988

(51) Int. Cl.
*B60T 11/22* (2006.01)
*B62L 3/02* (2006.01)

(52) U.S. Cl.
CPC .............. *B60T 11/22* (2013.01); *B62L 3/023* (2013.01)

(58) Field of Classification Search
CPC ...... B60T 11/16; B60T 11/165; B60T 11/228; B60T 11/22; B60T 11/26; B62L 3/02; B62L 3/023
See application file for complete search history.

(56) References Cited

U.S. PATENT DOCUMENTS

| | | |
|---|---|---|
| 3,344,944 A | 10/1967 | Shutt |
| 4,893,472 A | 1/1990 | Barker |
| 10,082,158 B2 | 9/2018 | Ruopp |
| 2008/0060885 A1 | 3/2008 | Ruckh et al. |
| 2008/0155982 A1 | 7/2008 | Jones et al. |
| 2015/0000267 A1 | 1/2015 | Ruopp |
| 2016/0129966 A1 | 5/2016 | Meggiolan et al. |
| 2016/0177976 A1 | 6/2016 | Ruopp |
| 2017/0002841 A1* | 1/2017 | Neutsch .................. B60T 11/26 |

FOREIGN PATENT DOCUMENTS

| | | |
|---|---|---|
| JP | S 61 110467 U | 7/1986 |
| JP | H06 42501 U | 6/1994 |
| TW | 201 033 077 A | 9/2010 |
| WO | 2015/064647 A1 | 5/2015 |

OTHER PUBLICATIONS

Non Final Office Action for U.S. Appl. No. 17/113,732 dated May 26, 2022.
Italian Search Report and Written Opinion in Italian Application No. 102019000023988, dated Jul. 17, 2020 with English translation.
Italian Search Report and Written Opinion in Italian Application No. 102019000023994, dated Aug. 24, 2020 with English translation.

* cited by examiner

*Primary Examiner* — Abiy Teka
*Assistant Examiner* — Daniel S Collins
(74) *Attorney, Agent, or Firm* — Volpe Koenig

(57) ABSTRACT

A hydraulic tank has an elastically deformable membrane defining a variable compensation chamber within the tank. The membrane has a fixed perimeter portion and a thrusting portion. A perimeter inlet portion is arranged between the perimeter fixing portion and the thrusting portion. In the condition of minimum expansion of the compensation chamber, the thrusting portion is completely arranged between the perimeter inlet portion of the membrane and a wall of the tank.

14 Claims, 5 Drawing Sheets

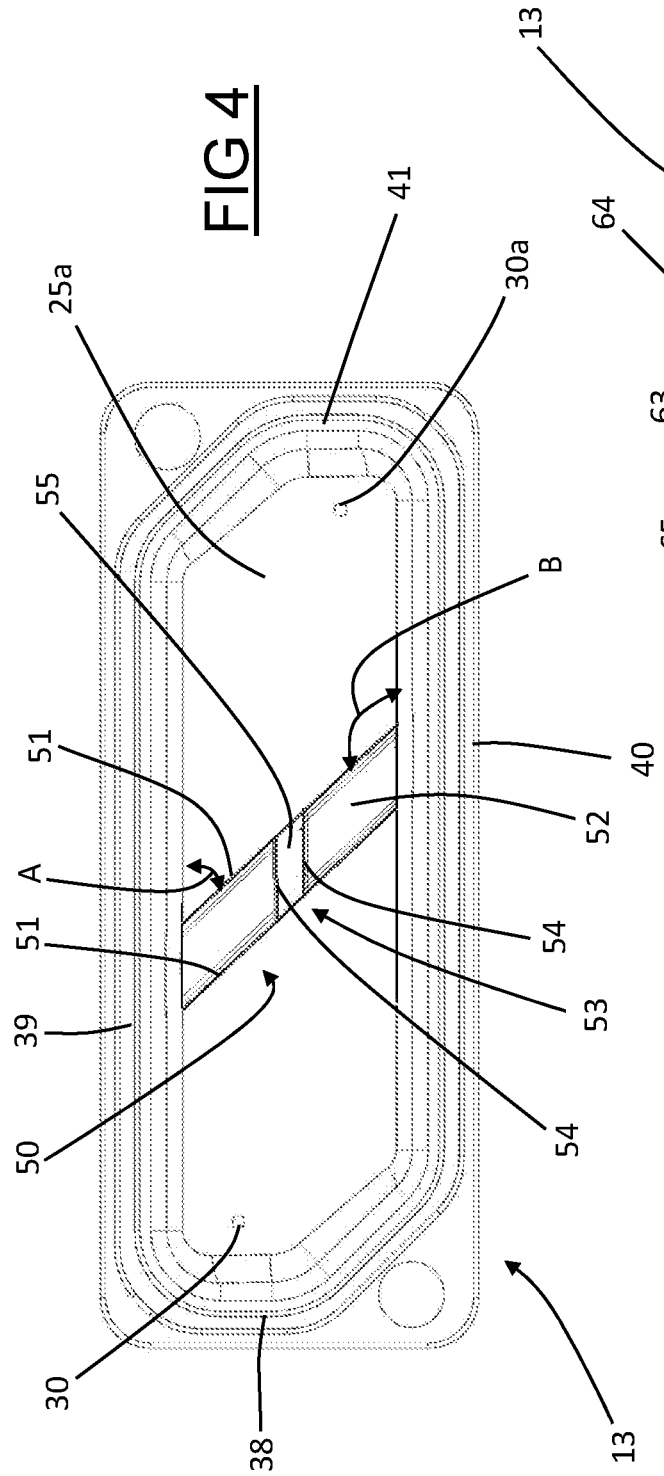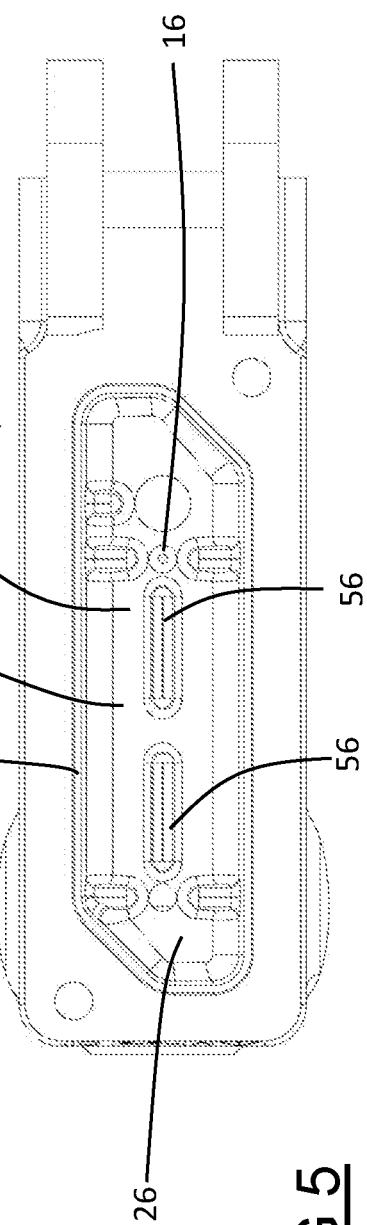

HYDRAULIC TANK FOR A BICYCLE

CROSS REFERENCE TO RELATED APPLICATION(S)

This application claims the benefit of Italian Application No. 102019000023988, filed on Dec. 13, 2019 which is incorporated herein by reference as if fully set forth.

FIELD OF INVENTION

The present invention relates generally to a hydraulic tank for a bicycle. More particularly, the present invention related to a hydraulic tank for a bicycle brake.

The invention also relates to a control device of a hydraulic brake for a bicycle that includes the hydraulic tank.

BACKGROUND

In modern bicycles, in particular in high performance bicycles, there is an increasingly use of onboard equipment that uses hydraulic controls. This is the case for example of hydraulic disc brake systems, in which the force necessary to obtain a suitable braking by means of the closing of the brake calipers on the discs is too high to be able to be easily exerted with the usual cable systems, controlled by the hands of the cyclist. With these braking systems, therefore, the force exerted by the hand of the cyclist is transferred to a hydraulic group.

In addition to the disc braking systems, other equipment can also use a hydraulic control. In particular, with reference again to the braking system, hydraulic rim braking systems are also known, in which the brake calipers act on the rim of the bicycle wheel, and not on discs like in the previous case.

Hydraulic brakes, and in particular hydraulic disc brakes, are often preferred to conventional pad brakes because they can ensure a high braking power and are less subject to problems caused by mud or water.

Typically, a disc brake comprises a brake caliper fixed to the frame of the bicycle or to the fork and a brake disc mounted on the hub of the wheel. Inside the brake caliper there is a hydraulic chamber in liquid communication with two opposite jaws, provided with respective friction gaskets (also called simply pads). The brake disc rotates inside the space defined between the two jaws. By bringing the jaws towards the brake disc, friction is generated between the brake disc and the pads and, consequently, the wheel is braked.

In order to move the jaws towards each other it is known to use a control device comprising a brake lever, a hydraulic cylinder in which a piston kinematically connected to the brake lever is able to slide and a tank in liquid communication with the hydraulic cylinder. The hydraulic cylinder is in liquid communication with a hydraulic chamber associated with the jaws.

By actuating the brake lever the liquid contained in the hydraulic cylinder of the control device is acted upon, the hydraulic cylinder sends pressurized liquid to the hydraulic chamber and the jaws are actuated.

Usually, the tank comprises a deformable membrane for transferring part of the liquid provided inside the tank to the hydraulic cylinder in order to ensure a suitable amount of braking liquid inside the hydraulic chamber also in the case of wearing of the pads. The wearing of the pads indeed causes an increase in volume of the hydraulic chamber that causes an increase in the stroke of the brake lever if not compensated through the aforementioned transfer of liquid from the tank to the hydraulic cylinder.

U.S. Pat. No. 10,082,158 B2 describes a hydraulic control for a bicycle brake that comprises a housing body that defines a cylinder in which a piston slides. The cylinder is in fluid communication with a tank defined between a surface of the housing body (which defines a lower surface of the tank) and a cover having a top wall and a side wall joined to the top wall. A free edge of the side wall of the cover is constrained to the lower surface of the tank. A membrane made of elastomeric material is arranged inside the tank. The membrane defines, in combination with the lower surface of the tank, a compensation chamber that contains a liquid. The membrane comprises a side wall and an upper wall, wherein the side wall is, on one side, held at the joining area between the cover and the lower surface of the tank and, on the opposite side, joined to the upper wall. When the compensation chamber is filled with liquid up to a maximum level (condition in which the pads of the brakes are not worn), the upper wall of the membrane reaches the top wall of the cover making the volume of the compensation chamber the maximum, whereas when there is a lower level of liquid in the compensation chamber (condition in which the pads of the brakes are worn), the upper wall of the membrane moves towards the lower surface of the tank reducing the volume of the compensation chamber.

The Applicant has found that in the hydraulic control described in U.S. Ser. No. 10/082,158B2, when the membrane is in the condition of maximum expansion of the volume of the compensation chamber, the membrane is arranged with its upper wall at the top wall of the cover and with its side wall that extends from the lower surface of the tank until it reaches the top of the cover and joins with the upper wall of the membrane. On the other hand, when the membrane is in the condition of minimum expansion of the volume of the compensation chamber, the upper wall of the membrane is arranged on the lower surface of the tank and the side wall of the membrane extends from the lower surface of the tank up to an area arranged between the lower surface of the tank and the top wall of the cover to then fold towards the lower surface of the tank and join to the upper wall of the membrane. The side wall of the membrane thus forms a cove (or retaining bag) in which a part of the liquid provided in the compensation chamber is trapped. Such a part of liquid cannot be used to compensate the wear of the pads of the brakes.

The Applicant has perceived that it would be advantageous to have a hydraulic tank for a bicycle in which substantially all of the liquid provided in the compensation chamber can be used to compensate the wearing of the brake pads.

SUMMARY

The Applicant's solution provides a hydraulic tank for a bicycle where an elastically deformable membrane is position between a first wall and a second wall of the hydraulic tank to create a compensation chamber. Through the second wall the tank is in liquid communication with a hydraulic cylinder. The volume of the compensation chamber is variable between a maximum volume defined in a condition of maximum expansion of the compensation chamber and a minimum volume defined in a condition of minimum expansion of the compensation chamber. The elastically deformable membrane has a perimeter portion fixed to the tank, a thrusting portion that acts on a brake liquid provided in the tank and a perimeter inlet portion arranged between the perimeter portion and the thrusting portion. In the condition of minimum expansion, the thrusting portion is completely arranged between the perimeter inlet portion of the membrane and the second wall of the tank.

BRIEF DESCRIPTION OF THE DRAWINGS

Further features and advantages of the invention will become clearer from the following description of a preferred embodiment thereof, made with reference to the attached drawings. In such drawings:

FIGS. 4 and 5 show a detail of the tank of FIG. 2;

DETAILED DESCRIPTION OF THE PREFERRED EMBODIMENTS

Figure 1:
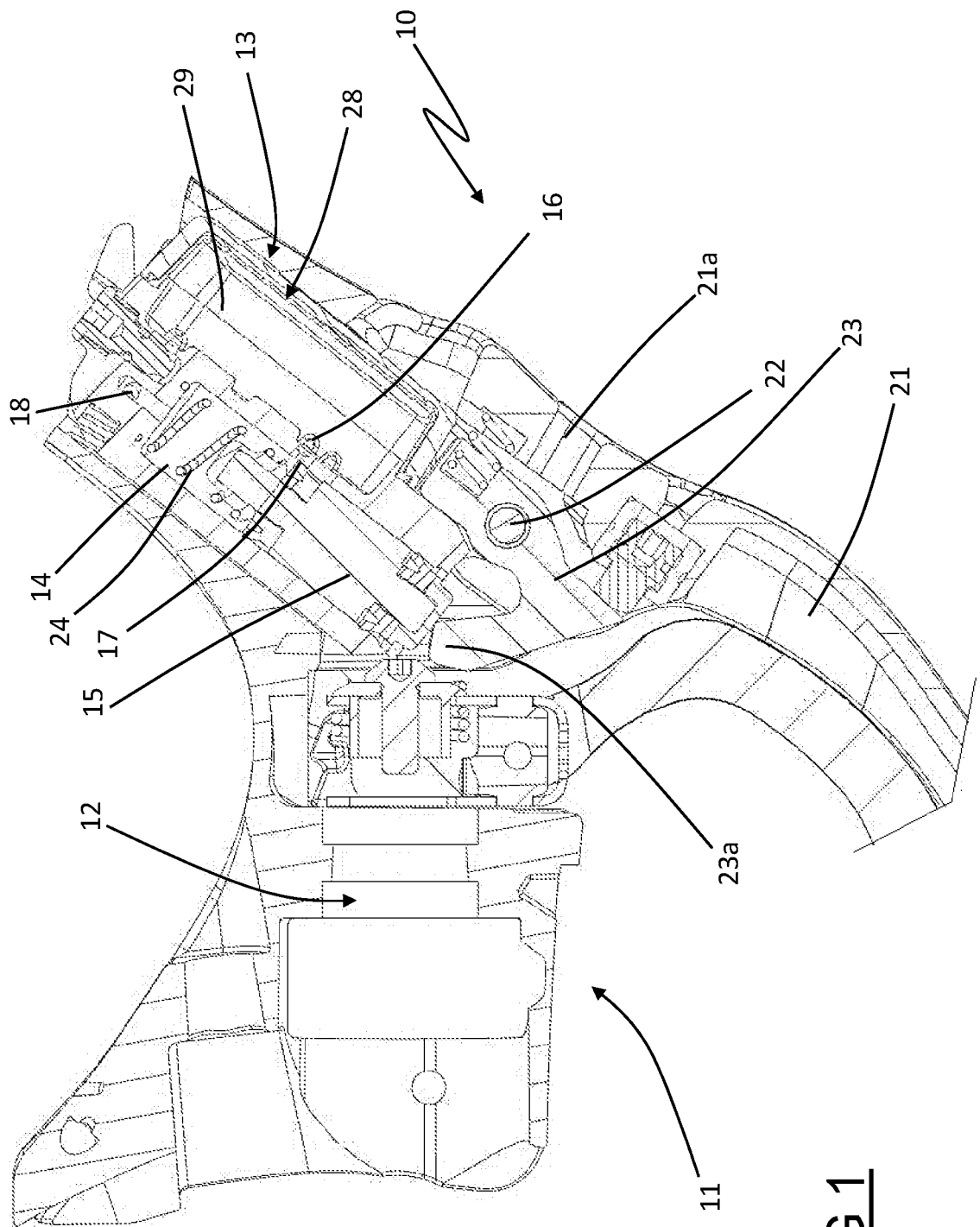
FIG. 1 is a section view of a control device of a hydraulic brake in accordance with an aspect of the present invention.

The present invention in a first aspect provides to a hydraulic tank for a bicycle, comprising:

a first wall;

a second wall opposite to the first wall and configured to place the tank in liquid communication with a hydraulic cylinder;

a side wall that extends between the first and the second wall;

an elastically deformable membrane operating between the first and the second wall and defining inside the tank a compensation chamber having a volume variable between a maximum volume defined in a condition of maximum expansion of the compensation chamber and a minimum volume defined in a condition of minimum expansion of the compensation chamber;

wherein the membrane comprises a perimeter fixing portion fixed to the tank, a thrusting portion configured to act on a brake liquid provided in the tank and a perimeter inlet portion arranged between the perimeter fixing portion and the thrusting portion, wherein the thrusting portion in the condition of minimum expansion of the compensation chamber is completely arranged between the perimeter inlet portion of the membrane and the second wall of the tank.

The membrane deforms inside the tank and reduces or increases the volume of the compensation chamber, thus compensating the wearing of the brake pads.

The peripheral inlet portion in the tank of the membrane is the membrane area, having a substantially annular but not necessarily circular shape, which defines a border between the membrane portion that can move and deform inside the tank, i.e. the thrusting portion of the membrane, and a membrane portion which is arranged outside of the tank and that is not subject to deformation during the change in volume of the compensation chamber, i.e. the perimeter fixing portion of the membrane. The perimeter inlet portion of the membrane in the tank is thus the membrane portion that defines a border between a mobile part of the compensation chamber and a fixed part of the compensation chamber.

When the membrane is in the condition of maximum expansion of the volume of the compensation chamber, the membrane is arranged with a central area of the thrusting portion in substantial contact with the first wall of the tank and with a side area of the thrusting portion, comprised between the perimeter inlet portion inside the tank and the central area of the thrusting portion, in substantial contact with the side wall of the tank. In this way, the volume of the compensation chamber substantially coincides with the volume of the tank.

When the membrane is in the condition of minimum expansion of the volume of the compensation chamber, the central area of the thrusting portion of the membrane is arranged in substantial contact with the second wall of the tank.

By providing the thrusting portion to be completely arranged between the perimeter inlet portion of the membrane and the second wall of the tank in the condition of minimum expansion of the compensation chamber, the side area of the thrusting portion of the membrane is also positioned substantially completely below the perimeter inlet portion of the membrane, avoiding the formation of bends or drastically reducing the formation of bends that form retaining bags for the liquid.

In this way, substantially all of the liquid provided in the compensation chamber can be transferred to the hydraulic cylinder and used to compensate for the wearing of the brake pads.

The present invention also relates, in a second aspect thereof, to a control device of a hydraulic brake for a bicycle comprising:

a hydraulic cylinder;

a piston slidably mounted in the hydraulic cylinder;

a tank according to the first aspect of the invention, the tank being in liquid communication with the hydraulic cylinder.

Such a control device has all of the advantages and the technical effects discussed above with reference to the tank of the present invention.

In the present description and in the following claims, the expression "in fluid communication with the environment outside the tank" is used to indicate a fluid communication with the atmospheric pressure, i.e. with the environment in which the bicycle moves.

Preferably, the perimeter inlet portion inside the tank of the membrane is arranged at a distance from the second wall of the tank comprised between about 35% and about 65% of the distance between the first and the second wall of the tank, more preferably between about 40% and about 60% of the distance between the first and the second wall of the tank, even more preferably between about 45% and about 55% of the distance between the first and the second wall of the tank.

In this way, when the compensation chamber is in the condition of minimum expansion it is possible to make a space inside the tank sufficient to substantially completely contain the thrusting portion of the membrane below the perimeter inlet portion of the membrane.

In particularly preferred embodiments, the distance between the perimeter inlet portion of the membrane and the second wall of the tank is equal to the distance between the perimeter inlet portion of the membrane and the first wall of the tank.

The Applicant has found that in this way the dimensions of the membrane can be the minimum necessary to allow it to be arranged at the first wall of the tank in the condition of maximum expansion of the compensation chamber and at the second wall in the condition of minimum expansion of the compensation chamber.

Preferably, a first portion of tank subtended between the first wall and a reference plane passing through the perimeter inlet portion of the membrane defines a volume comprised between 35% and 65% of the maximum volume of the tank, more preferably between 40% and 60% of the maximum volume of the tank, even more preferably between 45% and 55% of the maximum volume of the tank.

When the compensation chamber is in the condition of minimum expansion, the thrusting portion of the membrane is substantially completely arranged in such a volume.

When the compensation chamber is in the condition of maximum expansion, the thrusting portion of the membrane is preferably substantially completely contained in a volume of the tank complementary to such a volume.

In particularly preferred embodiments, a first portion of tank subtended between the first wall and a reference plane passing through the perimeter inlet portion of the membrane defines a volume equal to half the maximum volume of the tank.

Preferably, in the condition of minimum expansion of the compensation chamber, the thrusting portion of the membrane takes up a first configuration which is mirrored, with respect to a reference plane passing through the perimeter inlet portion of the membrane, to a second configuration taken up by the thrusting portion of the membrane in the condition of maximum expansion of the compensation chamber.

In this way, the thrusting portion of the membrane has substantially the same degree of deformation in the two extreme conditions of the compensation chamber, i.e. in the condition of maximum expansion and in the condition of minimum expansion. Such a provision makes it possible to minimize the dimensions of the membrane.

Preferably, the tank comprises a cover having a first wall and a side wall joined to the first wall.

Preferably, the tank comprises a container comprising a base wall and a side wall joined to the base wall and extending away from the base wall towards the first wall of the cover.

Preferably, the first wall of the tank is defined by the first wall of the cover, the second wall of the tank is defined by the base wall of the container and the side wall of the tank is defined by the side wall of the cover and by the side wall of the container.

In this way, the tank is preferably made of the container and the cover. By making the cover removable with respect to the container, it is possible to have access inside the tank, for example to replace the membrane or clean the inside of the tank.

Preferably, the side wall of the container comprises a free end edge.

Preferably, the perimeter inlet portion of the membrane is arranged at said free end edge.

In this way, the membrane enters into the tank at the free end edge of the side wall of the container, with the peripheral fixing portion arranged outside an inner volume of the container and with the thrusting portion facing inside the tank from the free end edge of the side wall of the container.

Preferably, the side wall of the cover is constrained to the container in a respective constraint area.

Preferably, the perimeter fixing portion of the membrane is constrained to at least one among the cover and the container at said constraint area.

Preferably, the membrane is held through the peripheral fixing portion in the constraint area outside the inner volume of the tank.

Preferably, the constraint area is arranged at the free end edge of the side wall of the container.

Preferably, the perimeter fixing portion of the membrane is constrained between the side wall of the cover and the side wall of the container.

Preferably, the first wall of the tank comprises an inner surface facing towards the second wall of the tank and comprising a protuberance that projects towards the membrane.

When the thrusting portion of the membrane takes up a configuration corresponding to the condition of maximum expansion of the compensation chamber, the thrusting portion of the membrane contacts the aforementioned protuberance.

The protuberance, projecting away from the inner surface of the first wall of the tank, prevents the thrusting portion of the membrane from completely adhere to the inner surface of the first wall of the tank. This allows to avoid the occurrence of an undesired suction cup effect between the thrusting portion of the membrane and the first wall of the tank, which could prevent the thrusting portion of the membrane from deforming correctly and suddenly to reduce the volume of the compensation chamber.

Preferably, the protuberance extends up to the side surface of the tank.

In this way, the protuberance is capable of coming into contact with the thrusting portion of the membrane for the entire extension of the latter along a predetermined direction thereof.

Preferably, the protuberance is arranged at a central area of the first wall of the tank and is inclined with respect to the side wall of the tank.

The Applicant has noted that by inclining the protuberance with respect to the side wall of the tank, i.e. by providing the protuberance to form an angle different from 90° with the side wall of the tank, the detachment effect of the thrusting portion of the membrane from the first wall of the tank is further improved, thus minimizing the aforementioned undesired suction cup effect.

Preferably, the protuberance comprises two opposite side walls, a central wall that connects the two side walls, and a groove formed on the central wall and open on both the side walls.

Such a groove defines a fluid passage between a first half-part of the volume defined between the inner surface of the first wall of the tank and the thrusting portion of the membrane and a second half-part of the aforementioned volume defined on the opposite side to the first half-part with respect to the protuberance and makes it possible to facilitate the detachment of the thrusting portion of the membrane from the first wall of the tank in the case in which the thrusting portion of the membrane is accidentally in partial contact with the first wall of the tank at one of the aforementioned half-parts.

Preferably, the cover has a substantially quadrangular shape and comprises a first surface and a fourth surface of the side wall of the cover which are opposite to one another.

Preferably, the cover also comprises a second surface and a third surface of the side wall of the cover which are opposite to one another.

The second and third surface of the side wall of the cover are arranged between the first and the fourth surface of the side wall of the cover.

Preferably, the first and the fourth surface of the side wall of the cover are substantially parallel.

Preferably, the second and the third surface of the side wall of the cover are substantially parallel.

Preferably, the first and the fourth surface of the side wall of the cover have respective extensions shorter than the respective extensions of the second and third surface of the side wall of the cover.

Preferably, the angle formed between the protuberance and the second surface of the side wall of the cover is supplementary to the angle formed between the protuberance and the third surface of the side wall of the cover.

With reference now to FIG. 1, a control device of a hydraulic brake for a bicycle, preferably a high-performance bicycle, is wholly indicated with 10.

The control device 10 is configured to be mounted on bicycle handlebars to control a hydraulically-actuated braking member configured to be mounted on a portion of the frame or on a portion of the fork of the bicycle.

The control device 10 comprises a housing body 11 configured to contain the hydraulic components of the control device.

The housing body 11 can also contain an actuation device of the speed change gear of the bicycle generically indicated with reference numeral 12 and not described any further since it is of the per se known type.

A tank 13 for a liquid, in particular oil, and a hydraulic cylinder 14 are provided inside the housing body 11.

Figure 2:
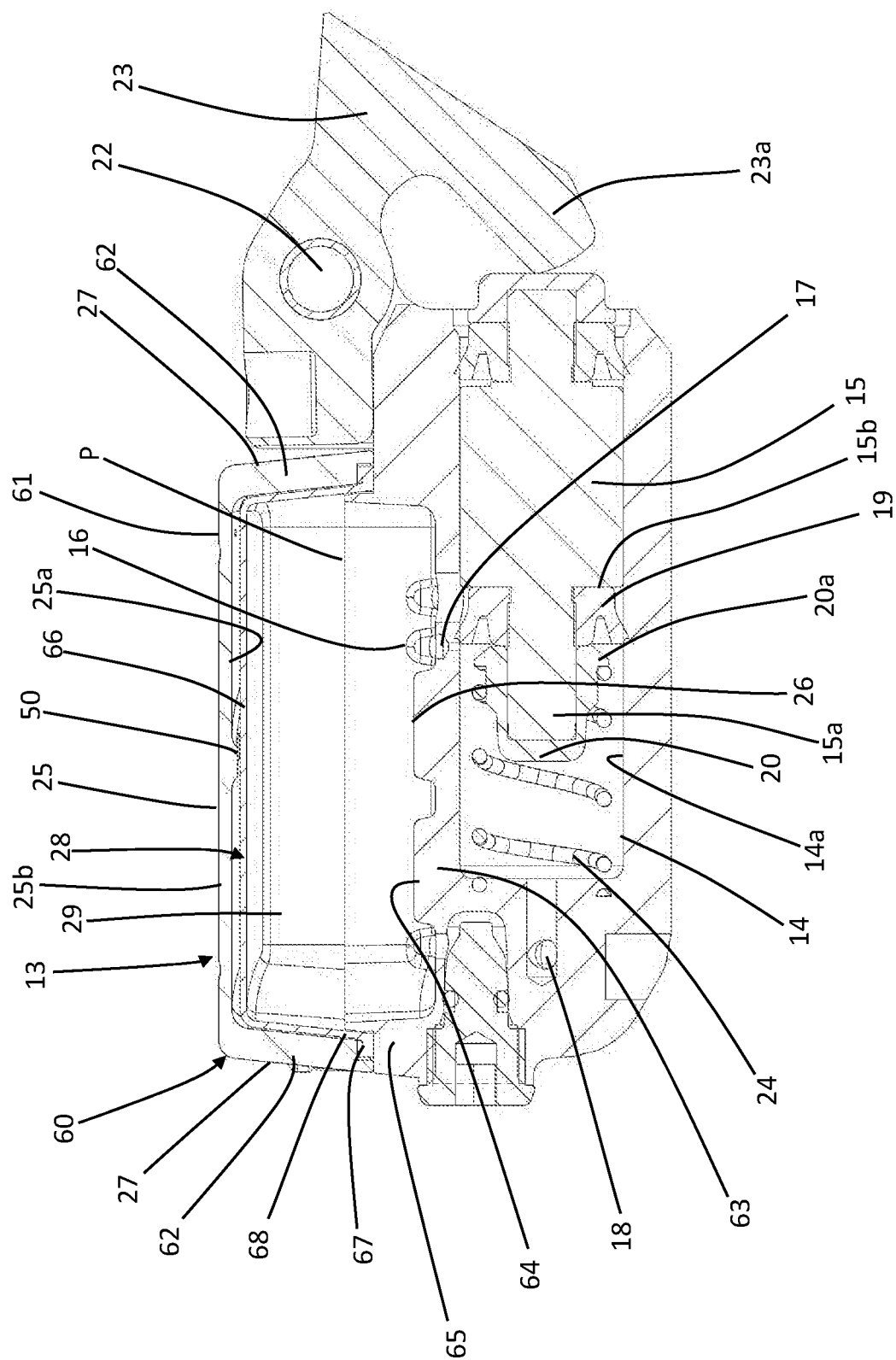
FIG. 2 is a section view of a hydraulic tank of the brake control device of FIG. 1.

The tank 13 comprises an outlet opening 16 which allows the liquid to reach the hydraulic cylinder 14. The hydraulic cylinder 14 comprises an inlet opening 17 which is in liquid communication with the outlet opening 16 of the tank 13 (FIG. 2).

The hydraulic cylinder 14 also comprises an outlet opening 18 configured to be connected directly, or through a connection channel, to a tube which is in turn connected with the braking member.

A piston 15, which is mobile between a first rest condition and a plurality of active positions, is slidably mounted inside the hydraulic cylinder 14.

In the rest position of the piston 15, the inlet opening 17 and the outlet opening 18 of the hydraulic cylinder 14 are in liquid communication, i.e. the liquid provided in the tank 13 can reach the outlet opening 18 of the hydraulic cylinder 14.

In the active positions of the piston 15, the inlet opening 17 and the outlet opening 18 of the hydraulic cylinder 14 are not in liquid communication, i.e. the liquid provided in the tank 13 cannot reach the outlet opening 18 of the hydraulic cylinder 14.

With this respect, the piston 15 comprises a hydraulic gasket 19 (better illustrated in FIG. 2) constrained to the piston 15 close to a head 15a of the piston 15 and operatively active between the piston 15 and an inner wall 14a of the hydraulic cylinder 14. The head 15a of the piston 15 is substantially shaped like a right prism with substantially constant section, for example cylindrical. In other words, the head 15a of the piston 15 does not have undercuts or holding projections for the hydraulic gasket 19. The hydraulic gasket 19 is fitted through a central hole thereof on the head 15a of the piston 15 and reaches an abutment surface 15b of the piston 15 from which abutment surface the head 15a emerges. A cap 20 that contacts the hydraulic gasket 19 is also inserted on the head 15a of the piston 15, so that the latter is held in position between the abutment surface 15b of the piston 15 and the cap 20.

The hydraulic gasket 19 prevents the liquid provided in the hydraulic cylinder 14 from leaking between the inner wall 14a of the hydraulic cylinder 14 and the piston 15, thus ensuring that the piston 15 can transfer a pressure to the liquid provided in the hydraulic cylinder 14 to direct it towards the outlet opening 18 of the latter.

When the piston 15 is in an active position, the hydraulic gasket 19 is positioned between the inlet opening 17 and the outlet opening 18 of the hydraulic cylinder 14, thus interrupting the liquid communication between inlet opening 17 and outlet opening 18.

For this purpose, the inlet opening 17 of the hydraulic cylinder 14 is arranged on a side surface of the inner wall 14a of the hydraulic cylinder 14, in a position such as to be intercepted by the hydraulic gasket 19 during the movement of the piston 15.

During a normal use of the bicycle, the actuation of the piston 15 between the first rest position and one of the second positions takes place by acting on a brake lever 21 of the control device 10.

The brake lever 21 is hinged to the housing body 11 close to an end 21a of the brake lever 21 through a pin 22 (FIG. 1). The brake lever 21 acts on a linkage to push the piston 15 towards the active positions when the brake lever 21 is rotated around the pin 22.

The linkage comprises, in the embodiment exemplified in the figures attached herein, a hammer 23 hinged to the housing body 11 through the same hinge pin 22 of the brake lever 21. A free end 23a of the hammer 23 is in contact with the piston 15, so that a rotation of the hammer 23 causes a thrust on the piston 15.

The brake lever 21 contacts the hammer 23 in a position thereof comprised between the pin 22 and the free end 23a, so that a rotation imparted by the cyclist to the brake lever 21 corresponds to a rotation in the same direction as the hammer 23.

In order to take the piston 15 back towards the rest position, a return mechanism is provided, which comprises a spring 24 active between the piston 15 and the hydraulic cylinder 14. The spring 24 tends to push the piston 15 away from the outlet opening 18 of the hydraulic cylinder 14.

The spring 24 tends to push, through the piston 15, the free end 23a of the hammer 23 and to make it rotate, thus causing an analogous rotation in the same direction as the brake lever 21. Therefore, the piston 15, and the brake lever 21 along with the piston 15, return to the rest position once the braking force exerted by the cyclist on the brake lever 21 stops.

As shown in FIG. 2, the spring 24 contacts the piston 15 at the cap 20, which acts as abutment for the spring 24 itself. For this purpose, the cap 20 comprises a shoulder 20a on which the spring 24 exerts its thrusting action.

The tank 13 comprises a first wall 25, a second wall 26 opposite to the first wall 25 and comprising the outlet opening 16, and a side wall 27 that extends between the first 25 and the second wall 26.

An elastically deformable membrane 28 operating between the first wall 25 and the second wall 26 is provided inside the tank 13. The membrane 28 defines inside the tank 13 a compensation chamber 29 having a variable volume between a maximum volume, reached when the compensation chamber 29 is in a condition of maximum expansion (illustrated in FIG. 2) and a minimum volume, reached when the expansion chamber is in a condition of minimum expansion (partially illustrated in FIG. 3).

The change in volume of the compensation chamber 29 is determined by the actual amount of fluid contained in the tank 13, which is a function of the degree of wear of the brake pads. In particular, the greater the wear of the brake pads, the lower the amount of fluid present in the tank 13, whereas the lower the wearing of the brake pads, the greater the amount of fluid present in the tank 13. Indeed, greater wearing of the brake pads corresponds to an increase in volume of a hydraulic chamber in fluid connection with the tank 13.

In order to allow the membrane 28 to deform inside the tank 13, and thus to allow the expansion and contraction of the compensation chamber 29, the tank 13 is placed in fluid communication with the outside so that the atmospheric pressure can act on the membrane 28.

For this purpose, a ventilation hole 30 (FIG. 7) is provided on the first wall 25 of the tank 13. The ventilation hole 30 passes through the first wall 25 and places the inside of the tank 13 in fluid communication with the outside.

Figure 6:
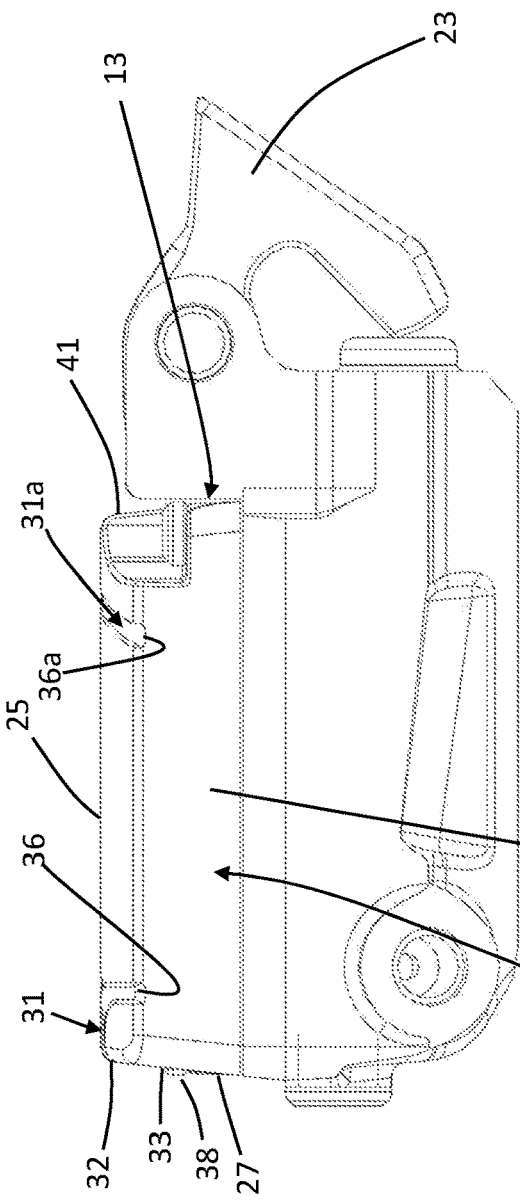
FIG. 6 is a side view of the tank of FIG. 2.
Figure 7:
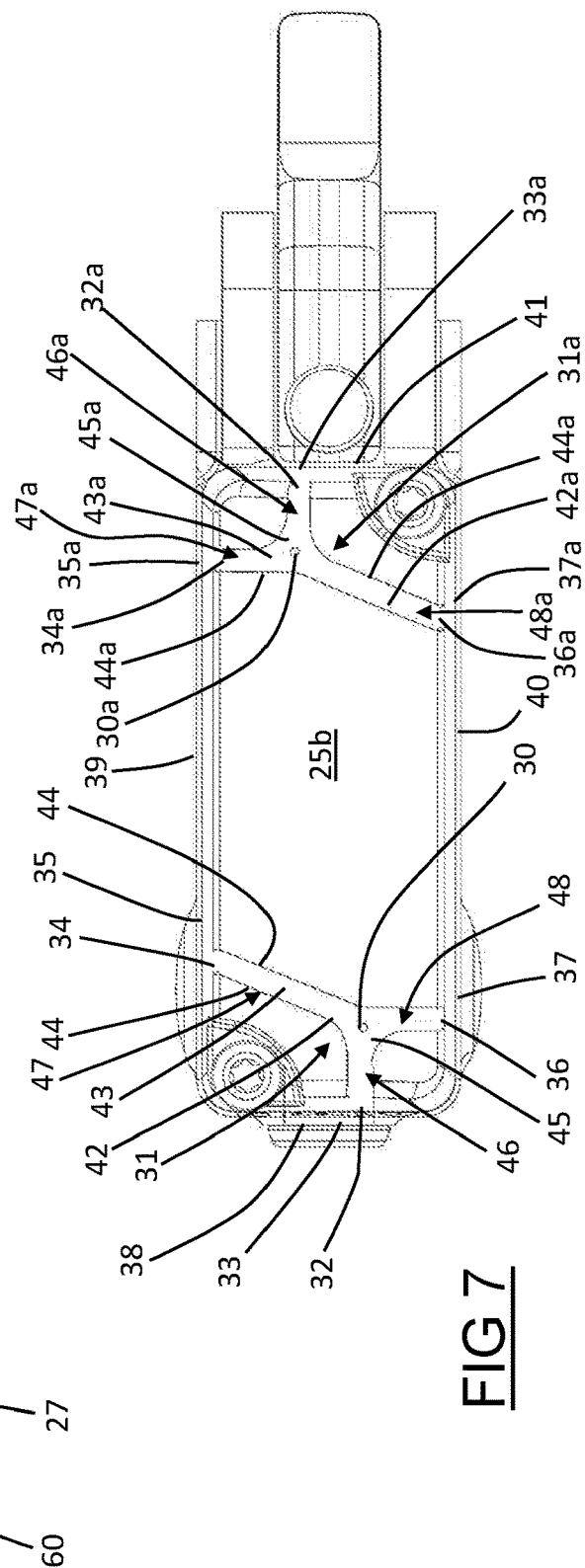
FIG. 7 is a top view of the tank of FIG. 2.

On the first wall 25 of the tank 13 a ventilation channel 31 is also provided. The ventilation channel 21 is in fluid communication with the ventilation hole 30 and comprises a first inlet opening 32 arranged on a first portion 33 of the side wall 27 of the tank 13 (FIGS. 6 and 7).

The ventilation channel 31 comprises a second inlet opening 34 arranged on a second portion 35 of the side wall 27 of the tank 13 different from the first portion 33 of the side wall 27 of the tank 13.

The ventilation channel 31 also comprises a third inlet opening 36 arranged on a third portion 37 of the side wall 27 of the tank 13 different from the first portion 33 and from the second portion 35 of the side wall 27 of the tank 13.

The tank 13 has a substantially quadrangular shape, with the side wall 27 having four surfaces substantially perpendicular to one another and substantially perpendicular to the first wall 25.

In particular, the side wall 27 of the tank 13 comprises a first surface 38, a second surface 39, a third surface 40 and a fourth surface 41. The second 39 and third surface 40 are substantially parallel to one another and the first 38 and fourth surface 41 are substantially parallel to one another, as illustrated in FIG. 7. The first surface 38 is substantially perpendicular to the second surface 39. The first 38 and the fourth surfaces 41 have substantially equal extension and the second 39 and third surface 40 have substantially equal extension. The extension of the first surface 38 is lower than the extension of the second surface 39.

The first portion 33 of the side wall 27 of the tank 13 is arranged on the first surface 38. In particular, the first portion 33 is arranged on the first surface 38 in a position closer to the third surface 40 than to the second surface 39.

The second portion 35 of the side wall 27 of the tank 13 is arranged on the second surface 39. In particular, the second portion 35 is arranged on the second surface 39 in a position closer to the first surface 38 than to the fourth surface 41.

The third portion 37 of the side wall 27 of the tank 13 is arranged on the third surface 40. In particular, the third portion 37 is arranged on the third surface 40 in a position closer to the third surface 40 than to the second surface 39.

The ventilation channel 31 is made by a ventilation route 42 formed in the thickness of the first wall 25 of the tank 13, in particular between an inner surface 25a and an outer surface 25b of the first wall 25.

The ventilation route 42 comprises a bottom wall 43, which defines a bottom surface for the ventilation channel 31. The bottom wall 43 is coplanar with the inner surface 25a of the first wall 25 of the tank 13 so that at the ventilation route 42 no projections directed towards the second wall 26 of the tank emerge from the inner surface 25a of the first wall 25.

The bottom wall 43 is delimited by side surfaces 44 that are opposite to one another and joined to the bottom wall 43 and to the outer surface 25b of the first wall 25 of the tank 13.

The ventilation route 42 is open at the outer surface 25b of the first wall 25 of the tank 13, so that the ventilation channel 31 is made by a groove formed in the first wall 25 of the tank 13.

The ventilation hole 30 is arranged on the bottom surface 43 of the ventilation channel 31, so that it does not reach the outer surface 25b of the first wall 25.

As illustrated in FIG. 7, the ventilation channel 31 comprises a joining area 45 at which the ventilation hole 30 is provided. A first segment 46 that connects the joining area 45, and therefore the ventilation hole 30, with the first inlet opening 32, a second segment 47 that connects the joining area 45, and thus the ventilation hole 30, with the second inlet opening 34 and a third segment 48 that connects the joining area 45, and thus the ventilation hole 30, with the third inlet opening 36 extend from the joining area 45.

In the preferred embodiment of the invention and illustrated in FIGS. 6 and 7, a further ventilation hole 30a that passes through the first wall 25 and places the inside of the tank 13 in fluid communication with the outside is provided on the first wall 25 of the tank 13.

A further ventilation channel 31a is also provided on the first wall 25 of the tank 13. The further ventilation channel 31a is in fluid communication with the further ventilation hole 30a. The further ventilation channel 31a is distinct from the ventilation channel 31. The further ventilation channel 31a comprises a first inlet opening 32a arranged on a further first portion 33a of the side wall 27 of the tank 13. The first inlet opening 32a of the further ventilation channel 31a is different from the first inlet opening 32 of the ventilation channel 31.

The further ventilation channel 31a comprises a second inlet opening 34a arranged on a further second portion 35a of the side wall 27 of the tank 13 which is different from the further first portion 33a of the side wall 27 of the tank 13. The second inlet opening 34a of the further ventilation channel 31a is different from the second inlet opening 34 of the ventilation channel 31.

The further ventilation channel 31a also comprises a third inlet opening 36a arranged on a further third portion 37a of the side wall 27 of the tank 13, which is different from the further first portion 33a and from the further second portion 35a of the side wall 27 of the tank 13. The third inlet opening 36a of the further ventilation channel 31a is different from the third inlet opening 36 of the ventilation channel 31.

The further first portion 33a of the side wall 27 of the tank 13 is arranged on the first surface 38. In particular, the further first portion 33a is arranged on the first surface 38 in a position closer to the second surface 39 than to the third surface 40.

The further second portion 35a of the side wall 27 of the tank 13 is arranged on the second surface 39. In particular, the further second portion 35a is arranged on the second surface 39 in a position closer to the fourth surface 41 than to the first surface 38.

The further third portion 37a of the side wall 27 of the tank 13 is arranged on the third surface 40. In particular, the further third portion 37a is arranged on the third surface 40 in a position closer to the second surface 39 than to the third surface 40.

The further first portion 33a is distinct from the first portion 33, just as the further second portion 35a is distinct from the second portion 35 and the further third portion 37a is distinct from the third portion 37.

The further ventilation channel 31a is made by a further ventilation route 42a formed in the thickness of the first wall 25 of the tank 13, in particular between an inner surface 25a and an outer surface 25b of the first wall 25.

The further ventilation route 42a comprises a bottom wall 43a which defines a bottom surface for the further ventilation channel 31a. The bottom wall 43a is coplanar with the inner surface 25a of the first wall 25 of the tank 13 so that at the further ventilation route 42 no projections directed towards the second wall 26 of the tank emerge from the inner surface 25a of the first wall 25.

The bottom wall 43a is delimited by side surfaces 44a that are opposite to one another and joined to the bottom wall 43a and to the outer surface 25b of the first wall 25 of the tank 13.

The further ventilation route 42a is open at the outer surface 25b of the first wall 25 of the tank 13, so that the further ventilation channel 31a is also made by a groove in the first wall 25 of the tank 13.

The further ventilation hole 30a is arranged on the bottom surface 43a of the further ventilation channel 31a, so that it does not reach the outer surface 25b of the first wall 25.

As illustrated in FIG. 7, the further ventilation channel 31a comprises a joining area 45a at which the further ventilation hole 30a is provided. A first segment 46a that connects the joining area 45a, and thus the further ventilation hole 30a, with the further first inlet opening 32a, a second segment 47a that connects the joining area 45a, and thus the further ventilation hole 30a, with the further second inlet opening 34a and a third segment 48a that connects the joining area 45a, and thus the further ventilation hole 30a, with the further third inlet opening 36a extend from the joining area 45a.

As illustrated in FIG. 4, the inner surface 25a of the first wall 25 of the tank 13 comprises a protuberance 50 that projects towards the second wall 26 of the tank 13.

The protuberance 50 is arranged in an area of the first wall 25 which is not occupied by the ventilation holes 30, 30a and not occupied by the ventilation channels 31, 31a.

The protuberance 50 extends between two opposite surfaces of the side wall 27 of the tank 13. As illustrated in FIG. 4, the protuberance 50 is arranged at a central area of the first wall 25 and divides the two ventilation holes 30, 30a. The protuberance 50 is inclined with respect to the side wall 27.

In particular, the protuberance 50 extends from the second surface 39 to the third surface 40 of the side wall 27 of the tank 13. An angle A is formed between the protuberance 50 and the second surface 39. Such an angle is supplementary to the angle B formed between the protuberance 50 and the third surface 40 of the side wall 27. In other words, the sum of the angle A formed between the protuberance 50 and the second surface 39 and the angle B formed between the protuberance 50 and the third surface 40 is 180°. In the preferred embodiment of the invention, the angle A formed between the protuberance 50 and the second surface 39 is about 45°. The angle B formed between the protuberance 50 and the third surface 40 is about 135°.

As shown in FIG. 4, the protuberance 50 comprises two opposite side walls 51 and a central wall 52 that connects the two side walls 51. The central wall 52 is substantially parallel to the inner surface 25a of the first wall 25 and the two side walls 51 are substantially perpendicular to the inner surface 25a of the first wall 25.

A groove 53 crosses the protuberance 50 and extends between the two side walls 51 of the protuberance 50. The groove 53 is open at the two side walls 51 of the protuberance 50 and comprises two side surfaces 54 substantially parallel to one another. The two side surfaces 54 are substantially parallel to the second surface 39 of the side wall 27 of the tank 13. The two side surfaces 54 extend from a bottom surface 55 that crosses the protuberance 50.

The side surfaces 54 have an extension towards the second wall 26 of the tank 13 that is lower than that of the side walls 51 of the protuberance 50, so that the groove 53 does not reach the inner surface 25a of the first wall 25 of the tank 13.

As illustrated in FIG. 5, the second wall 26 comprises a plurality of projections 56 that project towards the first wall 25 of the tank 13.

In the preferred embodiment of the invention, the tank 13 comprises a cover 60 having a first wall 61 and a side wall 62 joined to the first wall 61. The first wall 61 defines the first wall 25 of the tank 13. The side wall 62 of the cover 60 defines a first half-part of the side wall 27 of the tank 13. In particular, the side wall 62 of the cover 60 defines the first surface 38, the second surface 39, the third surface 40 and the fourth surface 41 of the side wall 27 of the tank 13.

The tank 13 also comprises a container 63 comprising a base wall 64 and a side wall 65 joined to the base wall 64. The side wall 65 extends from the base wall 64 towards the first wall 25 of the tank 13. In particular, the base wall 64 defines the second wall 26 of the tank 13 and the side wall 65 of the container 63 defines a second half-part of the side wall 27 of the tank 13. In particular, the side wall 27 of the tank 13 is defined by the side wall 65 of the container 63 and by the side wall 62 of the cover 60.

With particular reference to FIG. 2, the elastic membrane 28 comprises a thrusting portion 66, a fixing portion 67 fixed to the tank 13 and a perimeter inlet portion 68 in the tank 13.

The perimeter inlet portion 68 is arranged between the thrusting portion 66 and the fixing portion 67 and is only functionally distinct from the thrusting portion 66. In other words, there are no physical features of the membrane 28 capable of distinguishing the thrusting portion 66 from the perimeter inlet portion 68.

When the compensation chamber 29 is in the condition of maximum expansion, the thrusting portion 66 of the membrane 28 reaches the first wall 25 of the tank 13. In particular, the thrusting portion 66 contacts the protuberance 50 of the inner surface 25a of the first wall 25.

When the compensation chamber 29 is in the condition of minimum expansion, the thrusting portion 66 of the membrane 28 reaches the second wall 26 of the tank 13. In particular, the thrusting portion 66 contacts the protuberances 56 and rests on the second wall 26.

The perimeter inlet portion 68 of the membrane 28 is always arranged at an inlet region of the membrane 28 inside the tank 13. Such an inlet region does not move substantially when the compensation chamber 29 passes from the condition of maximum expansion to the condition of minimum expansion and when the compensation chamber 29 passes from the condition of minimum expansion to the condition of maximum expansion.

As schematically illustrated in FIG. 2, in the condition of maximum expansion of the compensation chamber 29 the thrusting portion 66 is completely arranged between the perimeter inlet portion 68 and the first wall 25 of the tank 13. In particular, in the condition of maximum expansion of the compensation chamber 29 the thrusting portion 66 reaches the first wall 61 of the cover 60 and rests at the side wall 62 of the cover 60.

Figure 3:
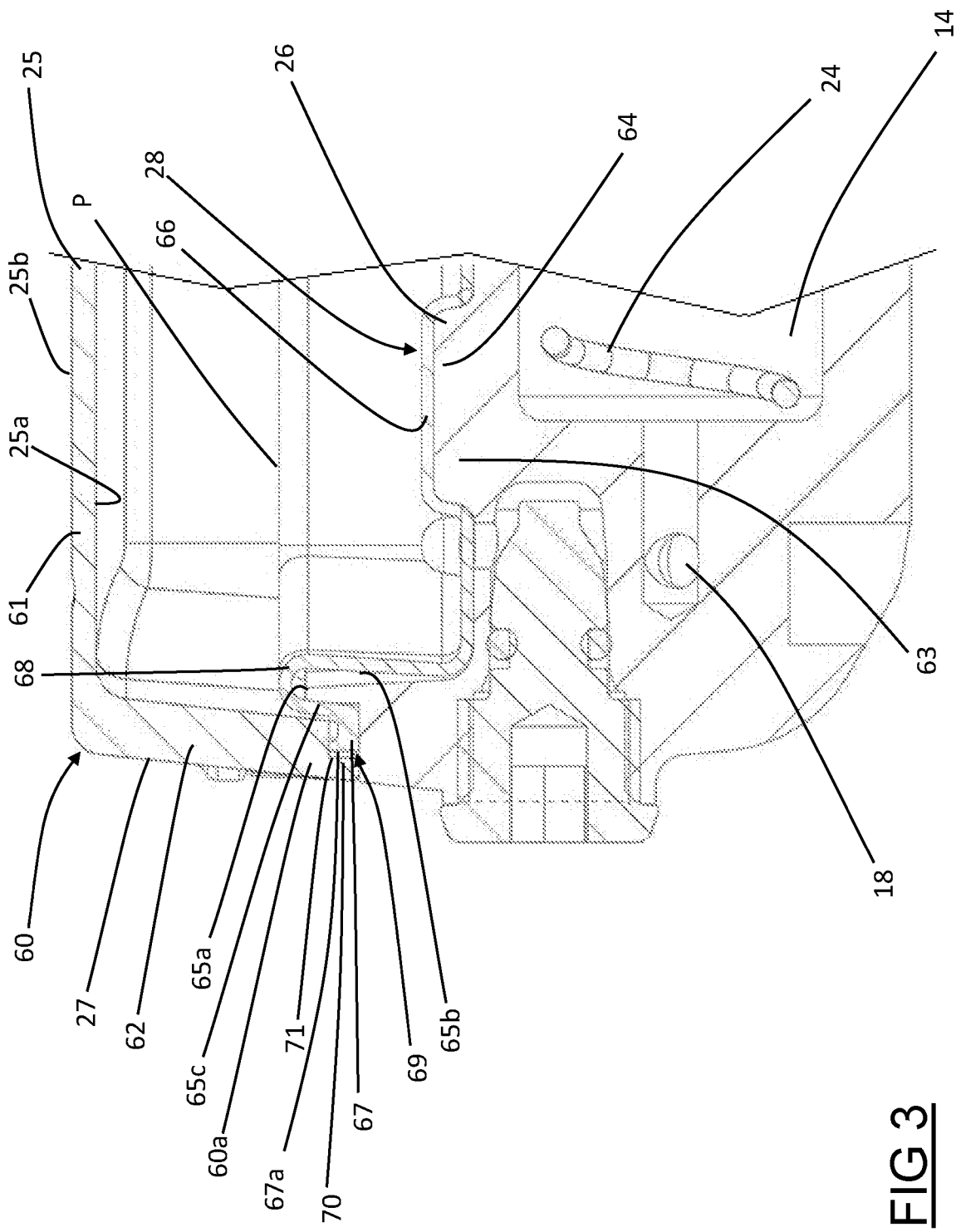
FIG. 3 is a section view of a detail of the tank of FIG. 2.

As schematically illustrated in FIG. 3, in the condition of minimum expansion of the compensation chamber 29 the thrusting portion 66 is completely arranged between the perimeter inlet portion 68 and the second wall 26 of the tank 13. In particular, in the condition of minimum expansion of the compensation chamber 29 the thrusting portion 66 reaches the base wall 64 of the container 63 and rests at the side wall 65 of the container 63.

In conditions of the compensation chamber 29 comprised between the condition of maximum expansion and the condition of minimum expansion (not illustrated in the attached figures), the thrusting portion 66 of the membrane is positioned between the first wall 25 and the second wall 26 of the tank 13.

In the preferred embodiment of the invention, in the condition of minimum expansion of the compensation chamber 29 the thrusting portion 66 of the membrane 28 takes up a configuration which is substantially mirrored, with respect to a reference plane P passing through the perimeter inlet portion 68 of the membrane 28, to the configuration taken up by the thrusting portion 66 of the membrane 28 in the condition of maximum expansion of the compensation chamber 29.

As illustrated in FIG. 3, the side wall 65 of the container 63 comprises a free end edge 65a. Such a free end edge 65a is arranged substantially half way between the first wall 25 of the tank 13 and the second wall 26 of the tank 13. The free end edge 65a is arranged at the perimeter inlet portion 62 of the membrane 28, so that the membrane 28 enters into the tank 13 substantially at the free end edge 65a.

As illustrated in FIG. 3, when the compensation chamber 29 is in the condition of minimum expansion the perimeter inlet portion 68 of the membrane 28 substantially rests on the free end edge 65a of the side wall 65 of the container 63. In such a condition of the compensation chamber 29, the thrusting portion 66 of the membrane 28 is arranged substantially in contact with a first surface 65b of the side wall 65 of the container 63 that is opposite to a second surface 65c of the side wall 65 of the container 63 which is in contact with the fixing portion 67 of the membrane. The perimeter inlet portion 62 of the membrane 28 lies at the free end edge 65a substantially between the first surface 65b and the second surface 65c of the side wall 65.

The fixing portion 67 of the membrane 28 is positioned in a constraint area 69 in which the cover 60 couples with the container 63 to make the tank 13. Such a constraint area 69 is arranged at the free end edge 65a of the side wall 65 of the container 63.

As better illustrated in FIG. 3, a perimeter end 60a of the cover 60 comprises a recess 70 that, in combination with the container 63, makes a receiving seat 71 for receiving a free end 67a of the fixing portion 67 of the membrane 28. The free end 67a is substantially held and compressed inside the receiving seat 71, so that the membrane is firmly held between cover 60 and container 63, thus making a fluid seal that prevents leaks of liquid between the compensation chamber 29 and the outside.

Of course, those skilled in the art can bring numerous modifications and variants to the present invention in order to satisfy specific and contingent requirements, all of which are in any case within the scope of protection defined by the following claims.

What is claimed is:

1. A hydraulic tank for a bicycle, the hydraulic tank comprising:
    a first wall;
    a second wall opposite to the first wall and configured to place the tank in liquid communication with a hydraulic cylinder;
    a side wall that extends between the first wall and the second wall;
    an elastically deformable membrane operating between the first wall and the second wall and defining inside the tank a compensation chamber having a volume variable between a maximum volume defined in a condition of maximum expansion of the compensation chamber and a minimum volume defined in a condition of minimum expansion of the compensation chamber;
    wherein the membrane comprises a perimeter fixing portion which is fixed to the tank, a thrusting portion configured to act on a liquid provided in the tank and a perimeter inlet portion arranged between the perimeter fixing portion and the thrusting portion, wherein in the condition of minimum expansion of the compensation chamber the thrusting portion is completely arranged between the perimeter inlet portion of the membrane and the second wall of the tank, and the first wall of the tank comprises an inner surface facing towards the second wall of the tank and comprising a protuberance that projects towards the membrane, wherein the protuberance is arranged at a central area of the first wall.

2. The hydraulic tank according to claim 1, wherein said perimeter inlet portion is arranged at a distance from the second wall of the tank that is between 35% and 65% of a distance between the first wall and the second wall of the tank.

3. The hydraulic tank according to claim 1, wherein a first portion of tank subtended between the first wall of the tank and a reference plane (P) passing through the perimeter inlet portion of the membrane defines a volume between 35% and 65% of the maximum volume of the tank.

4. The hydraulic tank according to claim 1, wherein a distance between the perimeter inlet portion of the membrane and the second wall of the tank is equal to a distance between the perimeter inlet portion of the membrane and the first wall of the tank.

5. The hydraulic tank according to claim 1, wherein in the condition of minimum expansion of the compensation chamber the thrusting portion of the membrane takes up a first configuration on a first side of a reference plane passing through the perimeter inlet portion of the membrane, and the thrusting portion of the membrane takes up a second configuration on a second side of the reference plane in the condition of maximum expansion of the compensation chamber.

6. The hydraulic tank according to claim 1, further comprising a cover having a first wall and a side wall joined to the first wall and a container comprising a base wall and a side wall joined to the base wall and extending away from the base wall towards the first wall of the cover; the first wall of the tank being defined by the first wall of the cover, the second wall of the tank being defined by the base wall of the container and the side wall of the tank being defined by the side wall of the cover and by the side wall of the container.

7. The hydraulic tank according to claim 6, wherein the side wall of the container comprises a free end edge and wherein the perimeter inlet portion of the membrane is arranged at said free end edge.

8. The hydraulic tank according to claim 6, wherein the side wall of the cover is constrained to the container in a respective constraint area and wherein the perimeter fixing portion of the membrane is constrained to at least one of the cover or the container at said constraint area.

9. The hydraulic tank according to claim 7, wherein a constraint area is arranged at the free end edge of the side wall of the container.

10. The hydraulic tank according to claim 6, wherein the perimeter fixing portion of the membrane is constrained between the side wall of the cover and the side wall of the container.

11. The hydraulic tank according to claim 1, wherein the protuberance extends up to the side surface of the tank.

12. The hydraulic tank according to claim 1, wherein the protuberance is inclined with respect to the side wall of the tank.

13. The hydraulic tank according to claim 1, wherein the protuberance comprises two opposite side walls, a central wall that connects the two side walls and a groove formed on the central wall and open on both the side walls.

14. A bicycle hydraulic brake control device comprising:
   a hydraulic cylinder;
   a piston slidably mounted in the hydraulic cylinder; and
   the hydraulic tank according to claim 1 in liquid communication with the hydraulic cylinder.

* * * * *